United States Patent
Føns

(10) Patent No.: US 11,346,606 B2
(45) Date of Patent: May 31, 2022

(54) COOLER

(71) Applicant: Føns Companies ApS, Faarup (DK)

(72) Inventor: Mogens Juhl Føns, Faarup (DK)

(73) Assignee: Føns Companies ApS, Faarup (DK)

( * ) Notice: Subject to any disclaimer, the term of this patent is extended or adjusted under 35 U.S.C. 154(b) by 0 days.

(21) Appl. No.: 16/976,107

(22) PCT Filed: Feb. 22, 2019

(86) PCT No.: PCT/DK2019/050066
§ 371 (c)(1),
(2) Date: Aug. 27, 2020

(87) PCT Pub. No.: WO2019/166067
PCT Pub. Date: Sep. 6, 2019

(65) Prior Publication Data
US 2021/0003346 A1 Jan. 7, 2021

(30) Foreign Application Priority Data
Feb. 28, 2018 (DK) .......................... PA 2018 00097

(51) Int. Cl.
*C04B 7/47* (2006.01)
*F27D 15/02* (2006.01)

(52) U.S. Cl.
CPC ............ *F27D 15/0213* (2013.01); *C04B 7/47* (2013.01); *F27D 2015/0233* (2013.01)

(58) Field of Classification Search
CPC ....... C04B 7/47; C04B 7/475; F27D 15/0213; F27D 15/02; F27D 2015/0233; F27D 2015/0246; F27B 7/38
See application file for complete search history.

(56) References Cited

U.S. PATENT DOCUMENTS

| 3,412,477 | A | * | 11/1968 | Kayatz | ................ | F27D 15/0213 34/164 |
| 4,337,857 | A | * | 7/1982 | Schneider | ........... | F27D 15/0213 110/290 |
| 4,629,421 | A | * | 12/1986 | Kreisberg | ........... | F27D 15/0286 34/168 |
| 6,382,963 | B2 | * | 5/2002 | Ramesohl | ............... | F27B 9/243 110/290 |

(Continued)

FOREIGN PATENT DOCUMENTS

DE 19542013 A1 5/1997
DK 19990143 A 4/2001
(Continued)

*Primary Examiner* — Gregory A Wilson
(74) *Attorney, Agent, or Firm* — James Creighton Wray

(57) ABSTRACT

The present invention discloses a cooler for cooling particulate material which has been subjected to heat treatment in an industrial kiln, such as a rotary kiln for manufacturing cement clinker. This cooler comprises an inlet, an outlet, end wall, side walls, a bottom and a ceiling, at least three reciprocating supporting lanes for receiving, supporting and transporting the material to be cooled, the lanes are moving following the walking floor principles as well as means for injecting cooling gas into the material through grate plates in the lanes. With the present invention it is an aim to have an increase in the vertical shearing height, and still having stationary clinker on top of the grate plates.

8 Claims, 1 Drawing Sheet

(56) References Cited

U.S. PATENT DOCUMENTS 6,920,702 B2 * 7/2005 Meyer .................... B65G 25/00
34/203

FOREIGN PATENT DOCUMENTS

| WO | 9848231 | A1 | 10/1998 |
| WO | 0177600 | A1 | 10/2001 |
| WO | 2009024084 | A1 | 2/2009 |
| WO | 2009156228 | A1 | 12/2009 |
| WO | 2018110420 | * | 12/2017 |

* cited by examiner

SECTION A-A

SECTION C-C

DETAIL B

COOLER

This application claims the benefit of Danish Application No. PA 2018 00097 filed Feb. 28, 2018 and PCT/DK2019/050066 filed Feb. 22, 2019, International Publication No. WO 2019/166067 A1, which are hereby incorporated by reference in their entirety as if fully set forth herein.

The present invention relates to a cooler for cooling particulate material which has been subjected to heat treatment in an industrial kiln, such as a rotary kiln for manufacturing cement clinker. This cooler comprises an inlet, an outlet, end wall, sidewalls, a bottom and a ceiling, at least three reciprocating supporting lanes for receiving, supporting and transporting the material to be cooled. The lanes are moving following the walking floor principles as well as means for injecting cooling gas into the material through grate plates in the lanes.

In DK 199901403 L a cooler of the above-mentioned kind is described. Furthermore is described that unfortunately, due to the physical laws, a cold channel problem of the cooling can occur. It is assumed that the clinker layer is locally having a lower air flow resistance. This could be due to the following reasons: larger void between the clinker, less clinker height or less clinker temperature. All three reasons will make an easier path for the air. Consequently, more air will pass here, and less air in the surrounding areas not having this local reduced air flow resistance phenomenon. This is actually an evil circle, because now the clinker temperature in the locally established cold channel will get cooled further and even more than the surrounding areas. Once the clinker is getting colder in relation to the surroundings, it will become an even more attractive pass for the following air. Hereby the evil circle of uneven cooling is born and will only accelerate. In other words: the physical laws and mathematics describe the instability when cooling with a compressible media—e.g. air—through a bulk material.

The instability is damaging the heat recuperation of the air temperature going back to the kiln, now diluted with the colder air coming through the cold channels. The main purpose of the cooler is to gain as much heat back from the hot clinker to the air returning to the kiln, so fuel can be saved in the burner. The recuperated air is the amount going through the clinker layer and returning to the kiln. See the recuperated air as the amount to the left of the dotted line in FIG. 2.

In reciprocating clinker coolers like DE19542013(A1)—where every second or third grate row is horizontally and perpendicularly to the clinker transport direction—the clinker layer will have an automatically vertical displacement (vertical shearing) in the layer when dropping over one grate plate end tip to the following grate plate, when clinker is moved towards the outlet of the cooler. Vertical shearing (vertical displacement) is NOT a mixing of top clinker to a bottom position and vice versa. On the contrary the clinker stays in the same vertical position after being subject to a vertical displacement (vertical shearing), only it is having a small plus and minus vertical distance to a neighbour clinker during vertical shearing.

In push bar coolers like WO9848231(A1) some bars are moving back and forth inside the clinker bed hereby transporting the clinker towards the outlet. In this type of cooler, the clinker layer will automatically have a vertical displacement (vertical shearing) in the layer when the push bar is moving toward the inlet trough the clinker, and hereby forcing the clinker over the cross-sectional shape of the push bar.

In DK199901403 L the above required vertical displacement (vertical shearing) is also published and described in details. Here some vertical elements are mounted between the aerated grate plates, the vertical elements' top are at a higher position than the top of the grate plates. The vertical element is perpendicular to the transport direction across the lane. The distance between two vertical elements will leave a pocket of stationary clinker in relation to the lane. The walking floor principle will move the clinker forward, when all lanes move together towards the outlet of the cooler. But when one lane retracts and the two neighbouring lanes are not moving, then the friction force from the stationary clinker above the two stationary neighbouring lanes will ensure that the clinker above the moving lane has at least only moved back a fraction of the distance which the lane is moving. Hereby the transport of the clinker is established. The clinker above the moving lane will be forced over the vertical element. But between two vertical elements the broader between moving clinker and stationary clinker will be at a lower position in relation to the top of the vertical elements. In DK199901403 L is mentioned different height of the vertical elements. This is to ensure that still stationary clinker is present in the middle of the grate plate, to ensure that the grate plate is not getting exposed to wear from moving clinker and create a sufficient vertical displacement (vertical shearing).

OBJECT OF THE INVENTION

The heat recuperation theoretically improves when the clinker bed height is increased, as the heat exchanger principle in the heat recuperation zone will act more like a counter-flow-heat-exchanger than the less efficient cross-flow-heat-exchanger. But at some point, the vertical shearing—as explained implanted from the bottom only—cannot be realized anymore. Therefore the cold channel problem will again start to damage the heat recuperation of the cooler.

The present invention relates to an increasing in the vertical shearing height and still having stationary clinker on top of the grate plates, see FIG. 5.

This is achieved by a cooler for cooling particulate material (2) which has been subjected to heat treatment in an industrial kiln (3), such as a rotary kiln for manufacturing cement clinker, which cooler (1) comprises an inlet (4), an outlet (5), end walls (6), side walls (7), a bottom (8) and a ceiling (9), at least three reciprocating supporting lanes (10) for receiving, supporting and transporting the material to be cooled, the lanes (10) are moving following the walking floor principles, cooling gas is injected upwards between the bottom (8) and the lanes (10), the cooling gas is going through grate plates (12) in the lanes (10), the cooling gas is then passing through the material (2) and where at a distance from the inlet a heat recuperation boarder is established such that air on the inlet side of the heat recuperation boarder (11) will return to the kiln (3) wherein the elements 16 extend upwards from an upper surface of the supporting lanes, where the elements (16) on a supporting lane are spaced creating a grate plate zone G (13), which element has an upper part L which is tilted towards the outlet (5) end of the cooler, which upper part has a length L (17) which is more than $1/40$ of G (13) and where the upper part L has an angle alpha (18) which is more than 5 deg. and less than 80 deg, between the upper part L and horizontal.

The friction coefficient between clinker and clinker is significantly higher than the friction coefficient between clinker and a plain plate e.g. made of steel or ceramic.

The before mentioned vertical element will be replaced by a mounting device of any shape used to support the plane part tilted toward the outlet end of the cooler, having an angle with horizontal –alpha. The length of the tilted part is L and the distance between two devices is G. The height H of the mounting device should only be sufficient to ensure no wear on the grate plates.

Since the air is distributed evenly from the full grate plate area it is obvious and understandable that the L*cosines (alpha) becomes a shadow area where all air from the region in the grate plate will go through the stationary clinker and leave the tip of L at this one point only. Again, it is not good for the heat recuperation to have a shadow area too big—as it, again, gives an uneven air flow through the clinker bed, damaging the heat recuperation.

The vertical shearing is on the other hand L*sine (alpha). But if alpha becomes too large (approximately above 60 deg.), it will act as before mentioned vertical element, as now the clinker will not get forced over the plate's L-part, and then the intended larger vertical shearing is not achieved.

It is hereby a compromise to get a certain vertical shearing: L*sine (alpha) by not having a too large shadow area L*cosines (alpha), but still having the angle alpha so low that the clinker will slide at L—see FIG. 5.

Further advantageous embodiments are disclosed in the dependent claims.

BRIEF INTRODUCTION OF THE DRAWINGS

DETAILED DESCRIPTION

Figure 1:
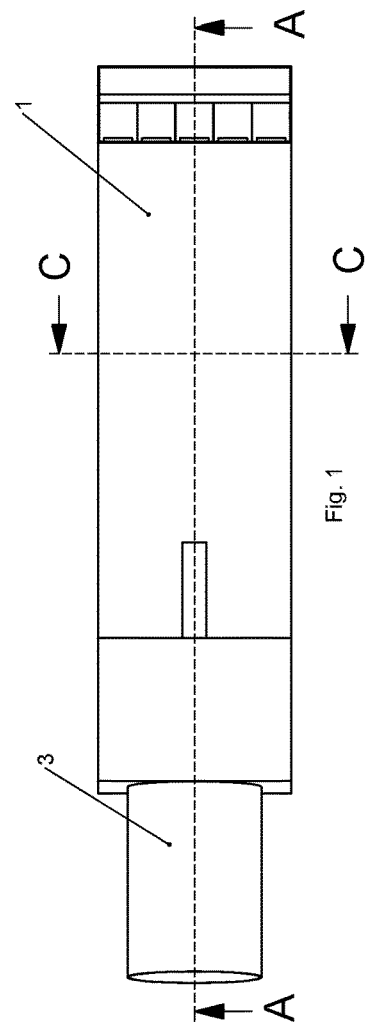
FIG. 1 illustrates a plain view of a cooling installation according to the invention.
Figure 2:
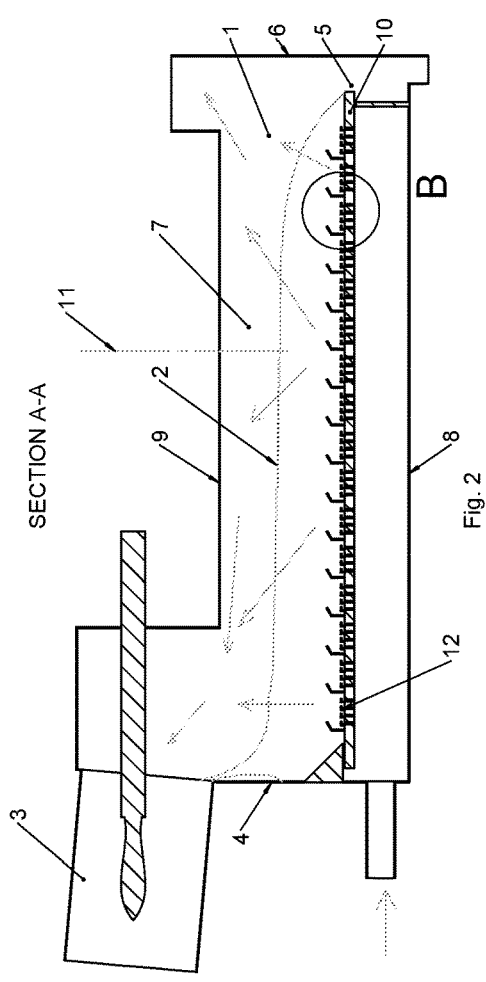
FIG. 2 illustrates a vertical cross section through the same installation as illustrated in FIG. 1.

In FIG. 1 is illustrated a plain view of a cooling installation 1 connected to a rotary kiln 3. In FIG. 2 is indicated a vertical cross section through the same installation where it may be seen that the rotary kiln is arranged above the cooling installation. The rotary kiln 3 is heated by a flame indicated by the hatched section and when cement clinker has been exposed to the heat treatment in the kiln it will for example be due to the inclination of the kiln be delivered onto an inlet end 4 of the cooling installation.

Figure 3:
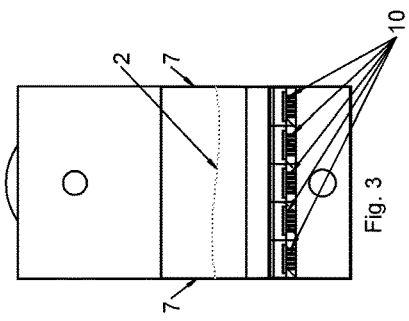
FIG. 3 illustrates that a cooling floor is provided with five reciprocating supporting lanes.

The layer of clinker is indicated by the light grey line 2 which thereby indicates particulate material. Opposite the inlet end is provided an outlet end 5 where the cooling floor as such is housed in a housing comprising walls 6, side walls 7, a bottom 8 and a ceiling 9. For the sake of explanation the present invention will be explained with respect to a cooling installation comprising three reciprocating supporting lanes 10. In this context please refer to FIG. 3 where it is illustrated that a cooling floor is provided with five reciprocating supporting lanes 10.

The particulate material 2 will be transported on the reciprocating supporting lanes according to the walking floor principle. The walking floor principle is very well-known for these types of cooling floors and does transport the particulate material from the inlet end to the outlet end by simultaneously pushing at least three reciprocating supporting lanes forward at the same speed. Thereafter two of the sliding lanes remain in position while the sliding lane positioned between these two sliding lanes is withdrawn.

Due to the friction between the particulate material not all the particulate material will be withdrawn during this movement such that the net effect of this reciprocating movement will be that the particulate material 2 is moved from the inlet 4 towards the outlet 5.

The sliding/reciprocating supporting lanes are provided with grate plates such that a cooling gas blown into the space between the bottom 8 of the cooling device and the grates in the sliding floor will be able to pass the supporting lanes. Due to the pressure in the gas being forced into the space between the bottom and the supporting lanes the gas will be forced up through the particulate material layer. Thereby the cooling gas will heat exchange with the very hot particulate material which has just left the kiln and move heat away from the particulate materials which is thereby cooled.

After the gas has passed the particulate material a portion of the gas will be led back to the kiln in order to help heat the clinker material inside the kiln thereby saving energy. Traditionally, there will be a heat recuperation border 11 which is delimiting the distance from the kiln where the gas which is passed through the particulate material will be led back through the kiln. Gas beyond this point will be led to a chimney as indicated by the arrows.

Figure 4:
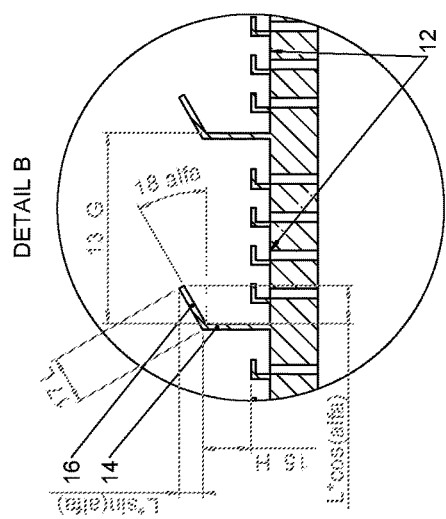
FIG. 4 illustrates a close-up of the reciprocating support lanes.

Turning to FIG. 4 a close-up of the reciprocating support lanes is indicated. The grate plates 12 are provided in the cooling supporting lanes in order to allow the cooling gas to pass through the supporting lanes 10.

Upstanding from the surface of the supporting lanes are elements 16 which extend upwards. These elements 16 are positioned with a certain space thereby creating grate plate zones 13. Particulate material between these upstanding elements will be stationary and as such as the reciprocating support lanes move back and forth the particulate material will not wear and tear on the sliding/reciprocating support lanes, but will only roll on top of the particulate material already caught in the grate plate zone.

The elements 16 are provided with an upper part L which is tilted towards the outlet 5. In this manner the effects relating to the movement of the particulate material as explained above will be obtained. It is clear that the tilted section having a length L will create a shadow for the gas passing out through the grate plates such that the cooling above the tilted section 17 will be less efficient.

Figure 5:
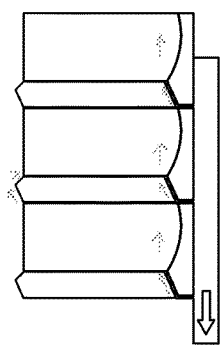
FIG. 5 illustrates a forward tilted section that increased bed height may be achieved providing a vertical shear without causing the cold channel problem.

As explained above with reference to recuperation of heat and the clinker bed height it is advantageous to have a relatively thick clinker layer/particulate material layer, but at the same time to have vertical shearing in order to create a certain resistance for the gas passing through the particulate material thereby improving the heat recuperation. This is achieved by the forward tilted section which is illustrated in FIG. 5 such that increased bed height may be achieved providing a vertical shear without causing the cold channel problem which is a channel through the particulate material allowing the air to pass more or less unhindered through the particulate material whereby the heat recuperation is severely diminished. Therefore, when a cold channel is established the heat recuperation is diminished and the cooling effect of the entire clinker bed is severely diminished. This leads to overall bad performance and a lack of recuperation of heat which could otherwise be reused in the kiln.

The invention claimed is:

1. A cooler (1) for cooling particulate material (2) which has been subjected to heat treatment in an industrial kiln (3), such as a rotary kiln for manufacturing cement clinker, which cooler (1) comprises an inlet (4), an outlet (5), end walls (6), side walls (7), a bottom (8) and a ceiling (9), at least three reciprocating supporting lanes (10) for receiving, supporting and transporting the material to be cooled, the lanes (10) are moving following the walking floor principles, cooling gas is injected upwards between the bottom (8) and the lanes (10), the cooling gas is going through grate plates (12) in the lanes (10), the cooling gas is then passing through the material (2) and where at a distance from the inlet a heat recuperation boarder is established such that air on the inlet side of the heat recuperation boarder (11) will return to the kiln (3) wherein elements 16 extend upwards from an upper surface of the supporting lanes, where the elements (16) on a supporting lane are spaced creating a grate plate zone G (13), which element has an upper part L which is tilted towards the outlet (5) end of the cooler, which upper part has a length L (17) which is more than $1/40$ of G (13) and where the upper part L has an angle alpha (18) which is more than 5 deg. and less than 80 deg. between the upper part L and horizontal.

2. A cooler according to claim 1, wherein the length L (17) is more than $1/20$ of G (13) and the angle alpha (18) is more than 5 deg. and less than 80 deg.

3. A cooler according to claim 1, wherein the length L (17) is more than $1/10$ of G (13) and the angle alpha (18) is more than 5 deg. and less than 80 deg.

4. A cooler according to claim 1, wherein the length L (17) is more than $1/5$ of G (13) and the angle alpha (18) is more than 5 deg. and less than 80 deg.

5. A cooler according to claim 1, wherein the length L (17) is more than $1/40$ of G (13) and the angle alpha (18) is more than 15 deg. and less than 80 deg.

6. A cooler according to claim 1, wherein the length L (17) is more than $1/20$ of G (13) and the angle alpha (18) is more than 15 deg. and less than 80 deg.

7. A cooler according to claim 1, wherein the length L (17) is more than $1/10$ of G (13) and the angle alpha (18) is more than 15 deg. and less than 80 deg.

8. A cooler according to claim 1, wherein the length L (17) is more than $1/5$ of G (13) and the angle alpha (18) is more than 15 deg. and less than 80 deg.

* * * * *